April 21, 1931.    A. B. STRAND    1,801,987

CLUTCH PEDAL OPERATOR

Filed July 25, 1927

Inventor
Alfred B. Strand

By Horace Pusch
Attorney

Patented Apr. 21, 1931

1,801,987

UNITED STATES PATENT OFFICE

ALFRED B. STRAND, OF ST. PAUL, MINNESOTA

CLUTCH-PEDAL OPERATOR

Application filed July 25, 1927. Serial No. 208,196.

My invention relates to a tractor clutch lever control wherein it is designed to operate the clutch lever by a lever means which is operable by hand and which permits the clutch pedal to be operated in the ordinary manner.

A feature of the invention resides in a pair of members interconnected in a manner to permit a sliding movement between the members in one direction without affecting the other, and to operate the members together for the purpose of operating the clutch pedal.

It is also an object of my invention to provide a handle operating member for the operating members together with a particular quadrant which is mounted in a manner to support the handle lever and of a strong and durable nature with standards adapted to support the same from the platform of the tractor.

I provide a resilient means associated with the operating members so as to cause the members to be contracted or drawn together on releasing the foot clutch lever. In this manner I provide a compact clutch operator which permits the clutch to be operated and set by hand operated means which can be operated and set to hold the clutch pedal in released position, overcoming the necessity of shifting the gearshift lever in starting and stopping the tractor. In the operation of a tractor this is important.

These objects together with other details of the invention will be more fully and clearly set forth in the specification and claims.

In the drawings forming part of my specification:

Figure 1:
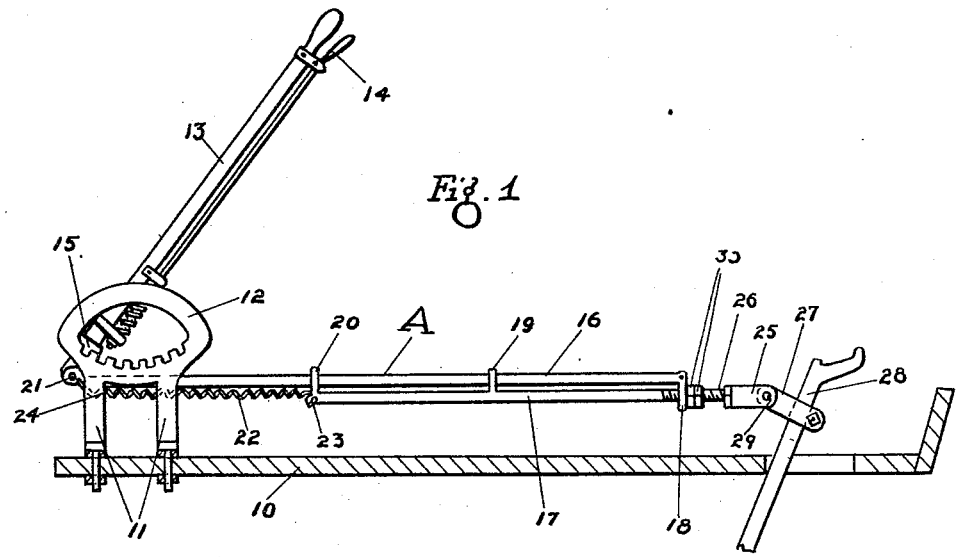
Figure 1 is a side view showing my clutch pedal operator.
Figure 2:
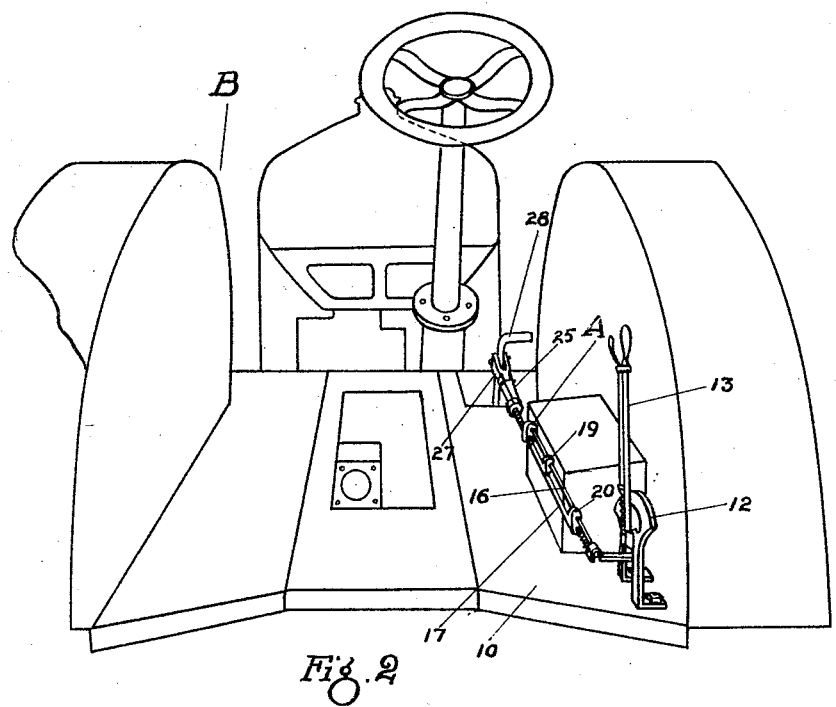
Figure 2 is a perspective view showing my clutch pedal operator attached to a tractor.

My clutch pedal operator A is of a simple design and of a peculiar nature so as to provide the necessary function in connection with the tractor. I have illustrated my clutch pedal operator A connected to the tractor B so as to show the operating position of the same.

The clutch pedal operator A is connected to the platform 10 of the tractor B by means of the standards 11 which support the quadrant loop 12. The hand operating lever 13 is pivotally connected to the quadrant 12 and is provided with a releasing handle 14 for the tongue 15 which is adapted to engage in the teeth of the quadrant 12 to hold the handle 13 in a set position.

The clutch pedal operator A is provided with a pair of operating rods 16 and 17 which are adapted to extend in parallel relation to each other and are slidably connected together by the loop and end 18 on the rod 16 and the loops 19 and 20 formed on the rod 17.

The loop 18 is formed on one end of the rod 16, and the other end of the rod 16 is pivotally connected at 21 to the operating end of the handle 13. I provide a suitable coil spring 22 which is connected at 23 to one end of the rod 17 and is connected at 24 to the standard 11 of the quadrant loop 12. This coil spring 22 is adapted to hold the rod 17 in backward position normally and permits the rod 17 to move forwardly in a parallel relation to the rod 16. The loops 19 and 20 form a bearing for one end of the rod 17 so as to permit the rod 17 to slide freely along the rod 16, as the rod 17 slides through the loop 18 which also forms a bearing for the forward end of the rod 17.

The rod 17 is provided with an adjustable connecting yoke 25 which is held on the forward threaded end 26 of the rod 17 and which is adapted to engage the coupler member 27. The coupler member 27 engages with the clutch pedal arm 28. The yoke 25 is pivotally connected to the coupler 27 at 29.

The rods 16 and 17 are adjustable in relation to each other by means of the adjusting nuts 30 which engage the threads 26 of the rods 17 and are adapted to form a shoulder against the loop 18 to hold the rod 17 in set position when the spring 22 has drawn it back along the rod 16. This adjustment through the nuts 30 is adapted to adjust the length of the clutch pedal operator A so that the distance between the pivot point 21 and the pivot point 29 may be adjusted to properly set the operating rods 16 and 17 in correct position to permit the clutch pedal 28 to assume its normal operating position as illustrated in Figure 1.

In operation the advantage of my clutch pedal operator resides in the adjustment between the operating members 16 and 17 which permits a longer or shorter adjustment between the clutch pedal arm 28 and the operating handle 13 of the clutch pedal operator A. It is desirable to provide a clutch pedal operator A which permits the hand operating lever 13 to be set at a distance from the clutch pedal 28 or in other words, the operating handle 13 must of necessity be set near the back end of the platform 10 of the tractor B. This is so that the operator of the tractor can readily operate the clutch pedal without getting up on the platform and it permits the operator of the tractor to adjust machinery, farm implements or equipment at the back of the tractor without getting up onto the platform 10 or in close relation to the clutch pedal 28.

In operation my clutch pedal operator permits the clutch pedal 28 to be operated by the hand lever 13 to push the clutch pedal into releasing position and the quadrant 12 will hold the same in this position until the hand lever 13 is released. The slideable connection of the operating rods 16 and 17 permits the clutch pedal 28 to be operated with the foot independent of the handle 13 by permitting the rod 17 to slide freely along the rod 16, the rods 16 and 17 having the loops 18, 19 and 20 which form bearings for the respective rods to parallelly connect the rods together to provide an adjustable connecting link between the handle 13 and the connecting coupler 27 and the pedal 28.

In accordance with the patent statutes I have described the principles of operation of my clutch pedal operator and while I have illustrated a particular formation and construction of the parts I desire to have it understood that the same is only illustrative of a means of carrying out my invention and that changes and variations may be made within the scope of the following claims without departing from the spirit of my invention.

I claim:

1. A clutch pedal operator comprising a pivoted hand lever, a rod pivotally secured to said lever, a second rod secured to a clutch pedal parallelly disposed to said first rod, loop means on said rods for slidably connecting the same, a stop for limiting the sliding motion in one direction, and spring means for holding the rods in this limited position.

2. A clutch pedal operator comprising a pivoted hand lever, a rod secured to said lever, a loop formed on the end of said rod, a second rod extending in parallel relationship to said first rod through said loop, a loop on said second rod through which said first rod extends to hold them in parallel relationship, a threaded end on said second rod, and a clamp for the clutch lever secured to said threaded end.

3. A clutch pedal operator including a pivoted hand lever, a rod pivotally secured to said lever, a loop on said rod, a second rod slidably extending in parallel relationship to said first rod through said loop, a loop on said second rod through which said first rod extends, a threaded end on said second rod, a yoke on said threaded end, and a clutch pedal clamp pivotally secured in said yoke.

ALFRED B. STRAND.